Dec. 9, 1930. J. S. KEEN 1,784,729
VALVE GEAR
Filed Dec. 30, 1929
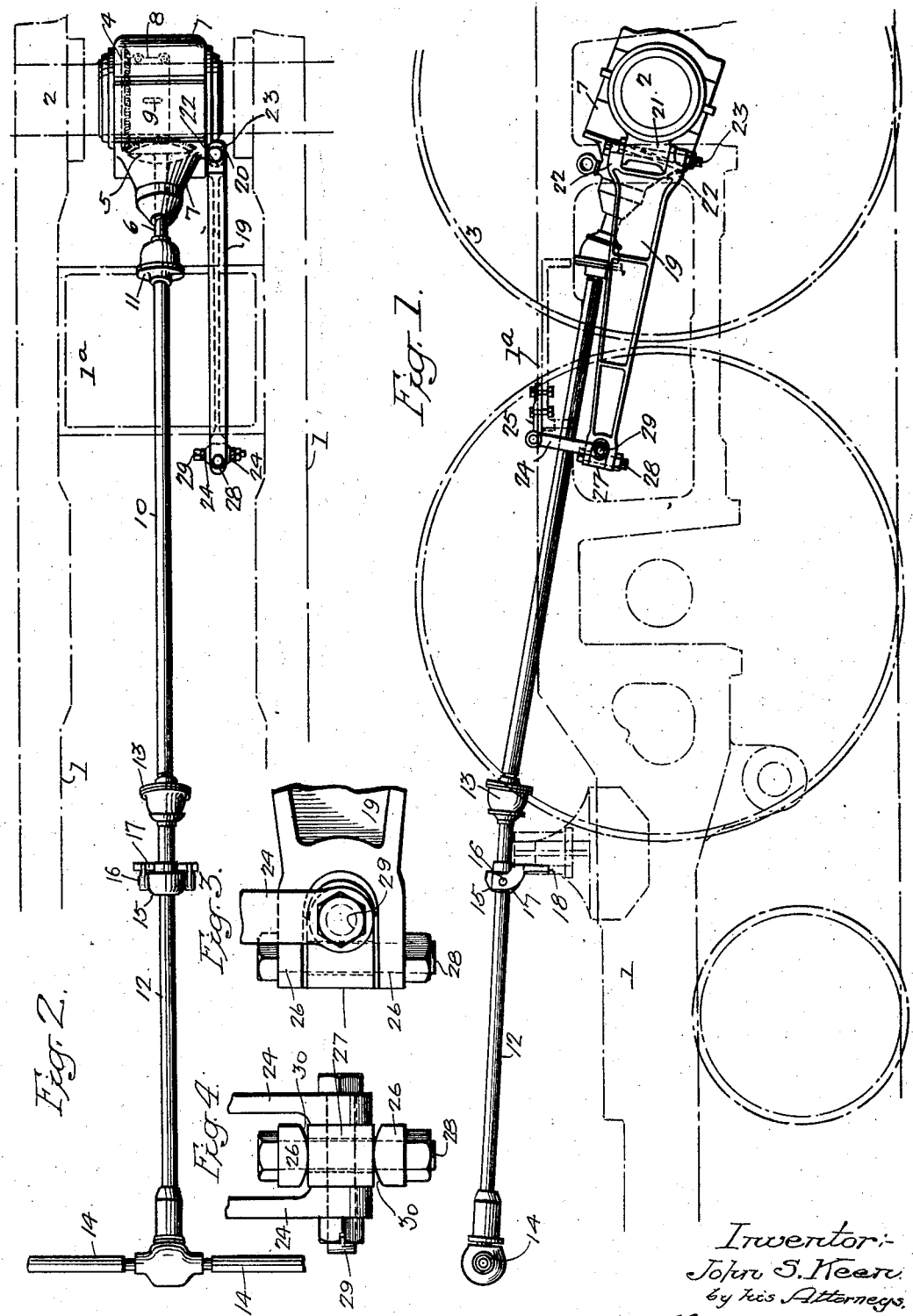
Inventor:-
John S. Keen
by his Attorneys
Howson & Howson Patented Dec. 9, 1930

1,784,729

UNITED STATES PATENT OFFICE

JOHN S. KEEN, OF PHILADELPHIA, PENNSYLVANIA

VALVE GEAR

Application filed December 30, 1929. Serial No. 417,525.

My invention relates to certain improvements in a valve gear, particularly of the "Caprotti" type, which is driven from one of the axles of the locomotive to which it is applied.

The object of my invention is to prevent the housing in which the driving gear is mounted from turning with the axle, yet allowing sufficient lateral movement of the box to accommodate itself to the lateral play between the hub of the driving wheel and the box face.

A further object of the invention is to support to a certain degree, the unbalanced portion of the gear and housing, and gear carried by the axle.

In the accompanying drawings:

Fig. 1 is a side view of my improved torque rod assembly and driving shaft of a valve gear, showing a part of the frame of the locomotive in dotted lines;

Fig. 2 is a plan view showing the frame of the locomotive in dotted lines;

Fig. 3 is an enlarged sectional view of the fulcrum block and part of the torque rod; and Fig. 4 is an end view of the fulcrum block and connections shown in Fig. 3.

1 are the side frames of the locomotive, which may be of any type desired. 2 is one of the driving axles of the locomotive on which is mounted wheels 3. Secured to the axle is a bevel gear wheel 4, which meshes with a beveled pinion 5 on a shaft 6, which has its bearings in a housing 7. This housing encloses both the gear wheel and the pinion as shown in the drawings. The gear wheel has an elongated hub 8 by which it is secured to the shaft, and a key 9 keys the gear wheel to the shaft, in addition to the other fastenings.

The shaft 6 is coupled to a shaft 10 by a universal joint 11 of any suitable type and the shaft 10 is coupled to a shaft 12 by a second universal joint 13. This shaft 12 is coupled to the transverse shaft 14 of the valve gear, which in the present instance is of the "Caprotti" type shown in patent to Caprotti, No. 1,549,712.

15 is a bearing for the shaft section 12, and on this bearing are two lateral trunnions 16, each of which is mounted in a bracket 17 projecting from a support 18 secured to the frame of a locomotive, as shown in Fig. 1.

With the above arrangement it is necessary to provide a torque rod to position the main housing 7. This rod 19 is attached to the main housing 7 by a hinge connection 20. In the present instance, the housing 7 has a projection 21, which is spanned by the forked ends 22 of the torque rod, and a pivot pin 23 extends through the parts as shown. The outer end of the torque rod is connected by links 24 to a bracket 25, on a cross tie 1a, which extends from one side frame 1 to the other. The details of the construction of the joint between the outer end of the torque rod and its links 24, are shown in Figs. 3 and 4. The outer end of the torque rod 19 is forked as at 26, and between the forks is the fulcrum block 27, through which a pivot bolt 28 extends, coupling the forks of the rod to the fulcrum block. The block is connected to the links 24 by a pivot bolt 29. The inner bearing surfaces of the forks 26 of the torque rod 19 have radial surfaces 30, Fig. 4, so that the flexibility of movement is provided at the fulcrum block, the hole in the fulcrum block for the pivot bolt 28 being of greater diameter than the pin, so as to allow for this flexibility. It will be seen that by this arrangement an additional universal joint such as at 13 is provided, which permits the angular alignment without bending the drive shaft, when the usual or maximum lateral play is obtained between the hub of the driving wheel and the box face.

By the above construction the torque rod permits vertical movement of the axle and also unequal rise of the ends of the axle, caused either by load conditions or by a broken spring or link.

I claim:

1. The combination in valve gears for locomotives, of an axle; a gear wheel on the axle; a shaft at right angles to the axle, and having a pinion thereon meshing with the gear wheel; a housing enclosing the gear wheel and the pinion, and forming a bearing for the shaft, said shaft being connected to the valve mechanism of the locomotive; a torque rod pivotally connected to the housing, so that the housing will have a limited amount of lateral movement; and a link connecting the outer end of the torque rod with the frame of the locomotive.

2. The combination in a locomotive, of an axle; a gear wheel secured to the axle; a shaft at an angle to the axle; a pinion on the shaft meshing with the gearing; a housing enclosing the gear wheel and pinion, and forming a bearing for the shaft; a torque rod pivotally connected to the housing so as to allow the housing a certain amount of lateral movement and preventing the housing turning on the axle; a fulcrum block pivotally mounted on the end of the torque rod; links pivotally connected to the fulcrum block; and a bracket on the frame to which the links are connected.

3. The combination in a locomotive, of an axle; a gear wheel on the axle; a shaft at an angle to the axle; a pinion on the shaft meshing with the gear wheel; a housing enclosing the gearing and forming a bearing for the shaft; a torque rod pivotally connected to the housing so as to allow the housing a certain amount of lateral movement and preventing the housing turning on the axle, the outer end of the torque rod being forked, the inner bearing surface of the forks being rounded; a fulcrum block mounted in the space between the forks; a pivot bolt extending through the forks and the fulcrum block; a pivot bolt at an angle to the first-mentioned pivot bolt; links through which the last-mentioned bolt extends; and a bearing on the frame of the locomotive to which the links are pivotally connected.

JOHN S. KEEN.